US011396205B2

(12) United States Patent
Yamamoto

(10) Patent No.: US 11,396,205 B2
(45) Date of Patent: Jul. 26, 2022

(54) SPOKE WHEEL

(71) Applicant: DAIDO KOGYO CO., LTD., Ishikawa (JP)

(72) Inventor: Toshihiro Yamamoto, Ishikawa (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 17 days.

(21) Appl. No.: 16/546,660

(22) Filed: Aug. 21, 2019

(65) Prior Publication Data

US 2020/0062032 A1   Feb. 27, 2020

(30) Foreign Application Priority Data

Aug. 22, 2018  (JP) ............................. JP2018-155741

(51) Int. Cl.
*B60B 21/06* (2006.01)
*B60B 1/04* (2006.01)

(52) U.S. Cl.
CPC .............. *B60B 21/06* (2013.01); *B60B 1/042* (2013.01); *B60B 1/043* (2013.01); *B60Y 2200/12* (2013.01)

(58) Field of Classification Search
CPC ..... B60B 21/06; B60B 21/062; B60B 21/066; B60B 1/042; B60B 1/043; B60B 1/04
USPC ....................................................... 301/55, 58
See application file for complete search history.

(56) References Cited

U.S. PATENT DOCUMENTS

| | | | | |
|---|---|---|---|---|
| 365,091 A | * | 6/1887 | Owen ...................... | A61H 3/04 |
| | | | | 301/95.105 |
| 1,474,631 A | * | 11/1923 | House, Jr. ............. | B60B 1/0223 |
| | | | | 301/55 |
| 2,034,360 A | * | 3/1936 | Sill ........................ | B21D 53/30 |
| | | | | 301/95.101 |
| 4,345,795 A | * | 8/1982 | Schardt ................. | B60B 1/0207 |
| | | | | 301/59 |
| 4,626,036 A | * | 12/1986 | Hinsberg .............. | B60B 1/0215 |
| | | | | 301/58 |
| 5,651,589 A | | 7/1997 | Bradley | |
| 6,145,937 A | * | 11/2000 | Chen .................... | B60B 21/062 |
| | | | | 301/58 |
| 2012/0280561 A1 | | 11/2012 | Tomkins | |

FOREIGN PATENT DOCUMENTS

| | | | | |
|---|---|---|---|---|
| GB | 334941 A | * | 9/1930 | ............. B60B 1/042 |
| GB | 378401 A | * | 8/1932 | ............. B60B 1/042 |
| GB | 2051696 A | * | 1/1981 | ............. B60B 21/06 |
| JP | 60-81101 | | 6/1985 | |
| JP | 4-339001 | | 11/1992 | |

(Continued)

OTHER PUBLICATIONS

Extended European Search Report dated Jan. 20, 2020 in corresponding European Patent Application No. 19192392.9.

(Continued)

*Primary Examiner* — Jason R Bellinger
(74) *Attorney, Agent, or Firm* — Wenderoth, Lind & Ponack, L.L.P.

(57) ABSTRACT

A spoke wheel includes a light alloy rim, a hub, and a plurality of wire spokes connecting the rim with the hub. The rim includes mounting flanges provided at asymmetrical positions with respect to a widthwise center of the rim and is connected with the hub by assembling the spokes to the mounting flanges. The spokes are disposed by being offset to the widthwise center of the rim.

7 Claims, 5 Drawing Sheets

(56) References Cited

FOREIGN PATENT DOCUMENTS

| | | |
|---|---|---|
| JP | 2013-35491 | 2/2013 |
| WO | 2007/082762 | 7/2007 |
| WO | 2009/081242 | 7/2009 |
| WO | 2010/100660 | 9/2010 |

OTHER PUBLICATIONS

The Bike Show: "MV Agusta Dragster RR", Youtube, Aug. 5, 2015, p. 1.

* cited by examiner

SPOKE WHEEL

BACKGROUND OF THE INVENTION

Field of the Invention

This application claims the benefit of Japanese Patent Application No. 2018-155741, filed on Aug. 22, 2018, which is hereby incorporated by reference herein in its entirety. The present invention relates to a spoke wheel in which a hub is connected with a rim by wire spokes and more specifically to a spoke wheel suitably applicable to a tubeless tire of a motorcycle.

Description of the Related Art

Hitherto, a light alloy rim for a tubeless tire is provided with a flange on a rim inner diametric side and is connected with a hub by retaining and locking spoke wires by the flange as disclosed in Japanese Patent Laid-open No. 2013-35491 for example. Regarding the flange of the rim 3, one flange is provided at a widthwise center O-O on an inner diametric side or a pair of flanges is provided equidistantly from the widthwise center O-O as illustrated in FIG. 5A such that stretch angles α of right and left spoke groups are equalized.

Accordingly, the conventional spoke wheel, or more accurately a wire spoke wheel 1, is arranged to be bilaterally symmetrical when viewed from a vertical section, i.e., a section orthogonal to a circular plane of the rim, and right and left spoke groups 2 are disposed bilaterally symmetrical with respect to the rim widthwise center O-O. Due to that, a brake unit 7 composed of a disc 5 and a caliper 6 is disposed at a position largely distant from the widthwise center O-O of the wire spoke wheel 1 to which a tire 9 is mounted so that the brake unit 7 does not interfere with the right and right spoke groups 2.

In a case of attaching the spoke wheel to a swing arm of a motorcycle, there are a twin holding swing arm and a cantilever swing arm. The twin holding swing arm includes right and left support arms. Because an axle and the spoke wheel are stably supported by these right and left support arms, controllability is secured even if the brake unit 7 is disposed at the position distant widthwise from the rim.

The cantilever swing arm includes a support arm only at one side and in a case where the swing arm supports the abovementioned spoke wheel, the brake unit 7 is disposed widthwise outside of the both rims. Therefore, the brake unit 7 is interposed between the cantilever support arm and the spoke wheel, a distance between the support arm and the spoke wheel is widened. Then, the spoke wheel is unstably supported and controllability may not be fully secured.

Due to that, while the cantilever swing arm is advantageous in adjusting a chain and in replacing a tire for example, it has been difficult to apply the spoke wheel including the light alloy rim to the cantilever swing arm.

SUMMARY OF THE INVENTION

According to one aspect of the present invention, a spoke wheel includes a light alloy rim, a hub, and a plurality of wire spokes connecting the rim with the hub. The rim includes mounting flanges provided at asymmetrical positions with respect to a widthwise center of the rim and is connected with the hub by assembling the spokes to the mounting flanges. The spokes are disposed by being offset to the widthwise center of the rim.

Further features of the present invention will become apparent from the following description of exemplary embodiments with reference to the attached drawings.

DESCRIPTION OF THE EMBODIMENTS

Figure 1:
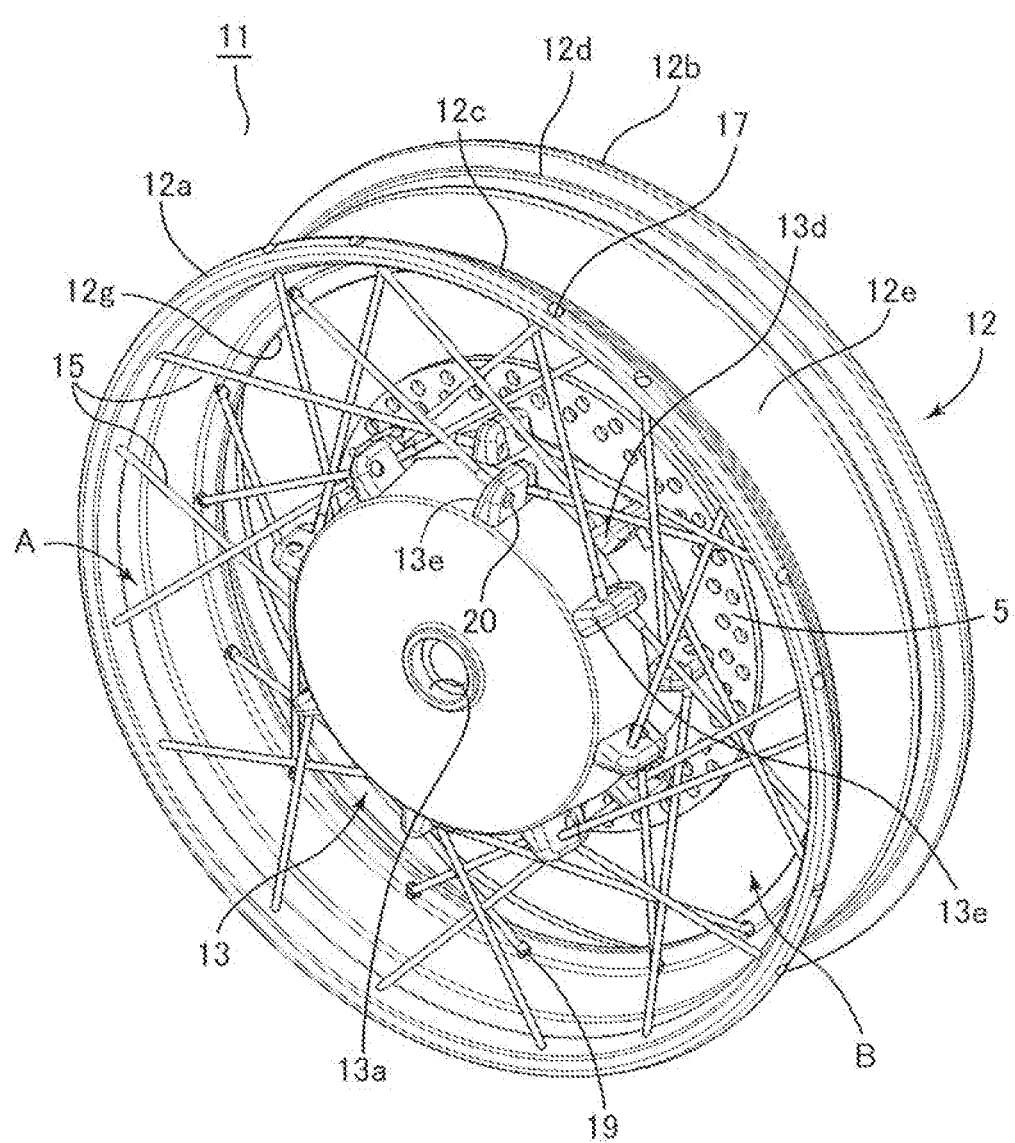
FIG. 1 is a perspective view (isometric drawing) illustrating an entire spoke wheel according to an embodiment of the present disclosure.
Figure 2:
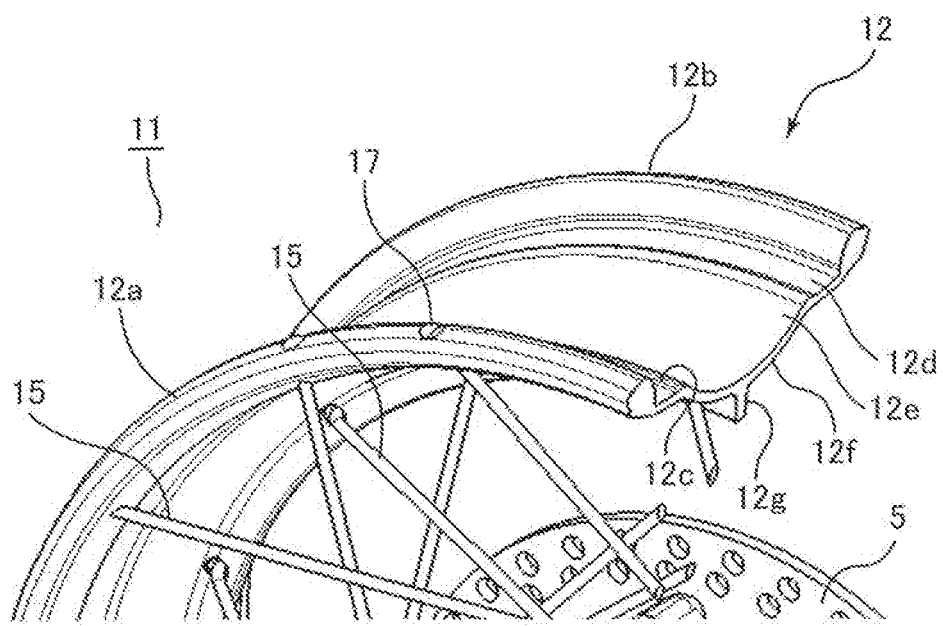
FIG. 2 is a perspective view illustrating by taking a part of the spoke wheel in FIG. 1.
Figure 3:
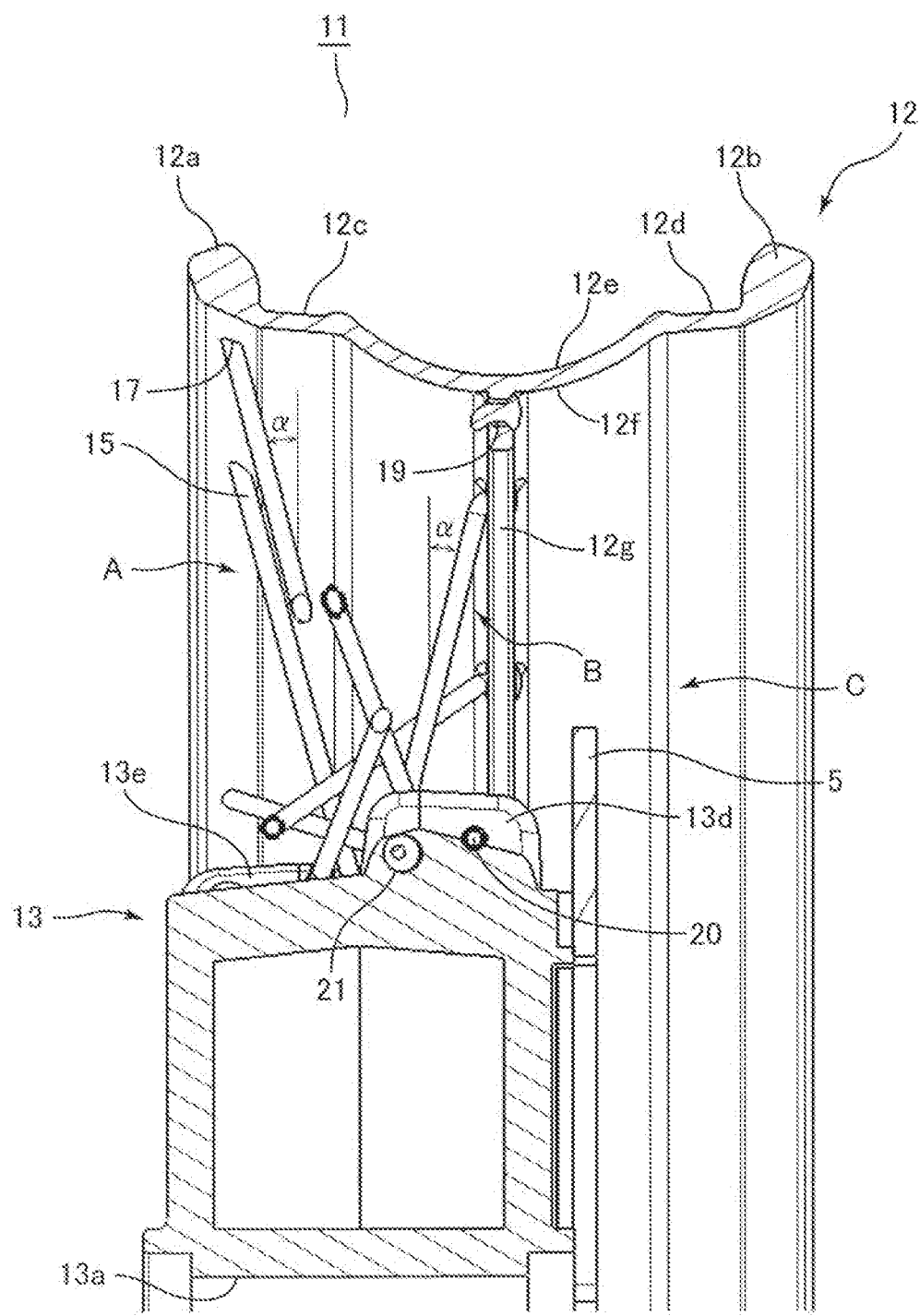
FIG. 3 is a section view illustrating an upper part of the spoke wheel in FIG. 1.

An embodiment of the present disclosure will be described with reference to the drawings. As illustrated in FIGS. 1, 2 and 3, a spoke wheel 11 includes a rim 12, a hub 13 and a large number of wire spokes 15 connecting the rim 12 with the hub 13. The rim 12 includes right and left outer flanges 12a and 12b erecting in an outer diametric direction at widthwise outer edges, bead seat portions 12c and 12d extending approximately horizontally at widthwise inner sides of the both flanges, a well portion 12e dented in an inner diametric direction at a widthwise inner side of these bead seat portions and an inner flange 12g disposed at a center of an inner diametric surface 12f of the well portion 12e and projecting annularly in the inner diametric direction of the well inner diametric surface 12f.

Right and left bead portions of a tire are mounted on the right and left bead seat portions 12c and 12d and outer side surfaces of the tire bead portions abut with and are supported by the right and left outer flanges 12a and 12b so that the tire is mounted on the rim 12. The well portion 12e is curvedly dented, and the tire bead portion gets into the well portion 12e such that an entire tire is received by the rim 12 in mounting the tire. The right and left outer flanges 12a and 12b are constructed to be equally thick to be able to keep rigidity of the rim 12 and to form a spoke hole 17 for locking a wire spoke 15.

The rim 12 is made of light alloy such as aluminum alloy or magnesium alloy. The rim 12 is molded so as to circularly bend by using a mold material formed by extrusion molding, by welding both ends and by drilling one of the outer flange 12a and the inner flange 12g. A large number of spoke holes 17 is perforated through the one of the outer flange 12a The one outer flange 12a having the spoke holes turns out to be a mounting flange. The spoke hole 17 extends approximately in a diametric direction along a rising angle of the outer flange 12a A spoke hole 19 penetrating through the inner flange 12g may extend approximately in a horizontal direction or may be an inclined hole inclined in the inner diametric direction toward the spoke.

The hub 13 is composed of a cylindrical member having a hole 13a fitting with an axle, and a large number of lug portions 13d and 13e projecting in an outer diametric direction is formed in a circumferential direction of the hub 13 respectively on right and left outer circumferential surfaces which are distant by a predetermined distance in a width direction, i.e., in an axial direction, of the cylindrical member. The large number of right and left lugs portions 13d and 13e is provided respectively with holes 20 penetrating therethrough in the circumferential direction.

Stretched between the spoke holes 17 perforated through the one outer flange 12a of the rim 12 and the holes 20 perforated through the lug portion 13d on the widthwise inner side of the hub 13 are the wire spokes 15 with a circumferential predetermined angle (referred to as a "plane angle" in general) and a widthwise predetermined angle (referred to as an "elevation angle" in general). Still further, the wire spokes 15 are stretched between the spoke holes 19 perforated through the inner flange (mounting flange) 12g of the rim 12 and the holes 20 perforated respectively through the lug portions 13e on the widthwise outer side of the hub 13 with the predetermined plane angle and elevation angle. That is, a spoke group (referred to as a "first spoke group A" hereinafter) including the spokes 15 each having a head retained and locked by the spoke hole 17 perforated through the outer flange 12a of the rim 12 is stretched to the hole 20 of the inner lug portion 13d which is located on a side widthwise opposite to the hole 20 in the hub 13 by a nipple 21. Then, a spoke group (referred to as a "second spoke group B" hereinafter) including the spokes 15 each having a head retained and locked by the spoke hole 19 perforated through the inner flange 12g of the rim 12 crosses with the spokes 15 of the first group A and is stretched to the hole 20 of the outer lug portion 13e which is located on a side widthwise opposite to the hole 19 in the hub 13 by a nipple 21.

As illustrated in FIG. 3, the rim 12 is connected with the hub 13 such that their axial directions are paralleled and their widthwise positions are defined by the respective wire spokes 15 included in the first spoke group A and the second spoke group B stretched by being separated by the widthwise predetermined distance. Thus, the spoke wheel 11 is assembled. A widthwise angle α of each wire spoke 15 of the first spoke group A (the elevation angle, referred to as a "stretch angle" hereinafter) and the stretch angle α of each wire spoke 15 of the second spoke group B are adjusted to be almost equalized by adjusting tension of the nipple 21. This arrangement makes it possible to dispose the wire spokes 15 by being offset by a predetermined amount from the widthwise center O-O of the rim 12 and the hub 13 and to keep the rim 12 and the hub 13 stably in the abovementioned state in the spoke wheel 11.

The respective wire spokes 15 of the first spoke group A and the second spoke group B are disposed at positions biased on one side from the widthwise center O-O of the rim 12, and another side where no spoke 15 is stretched within the rim 12 turns out to be a hollow space C. Therefore, a disc 5 is fixed on a side surface of the hub 13 on a side of the hollow space C which is spaced in the width direction of the rim 12, and a brake unit 7 composed of the disc 5 and a caliper 6 disposed in a support arm 10c of the swing arm 10₂ (see FIG. 5B) is disposed within the hollow space C of the rim 12. Therefore, as illustrated in FIG. 5B, the spoke wheel 11 in which the brake unit 7 is disposed within a width of the rim 12 without interfering with the spoke 15 in the cantilever swing arm 10₂.

The spoke wheel 11 is configured such that the inner flange 12g is disposed at the center of the well portion 12e, i.e., at the widthwise center O-O. The right and left outer flanges 12a and 12b are both constructed to be thick. Therefore, the mold material made of aluminum alloy forming the rim 12 is bilaterally symmetrical. The mounting flange is formed by perforating the spoke hole 17 through the one outer flange 12a of the circular rim made of the mold material. The spoke 15 of the first spoke group A is assembled to the one outer flange 12a and the spoke 15 of the second spoke group B is assembled to the inner flange 12g at the widthwise center in the spoke wheel 11.

Because a cross-section of the spoke wheel 11 is bilaterally symmetrical, workability is improved. Still further, there is a case where an attachment position of a driving source member such as a sprocket assembled to the spoke wheel and a position of the support arm of the cantilever swing arm are laterally different depending on differences of traffic system such as traveling on a left or right side of a road. In such a case, it is possible to select the mounting flange by perforating the spoke hole 17 either through the right or left outer flange 12a and 12b in the spoke wheel 11. For instance, in a case where the spoke 15 is disposed by being offset on the left side in terms of a motorcycle traveling direction, the spoke hole may be perforated through the left outer flange 12b and the spoke is assembled to the spoke hole. Then, the spoke is assembled to the center inner flange 12g at the widthwise center. This arrangement makes it possible to use the common rim 12 even if the spoke is disposed at either side of the right and left.

Figure 5A:
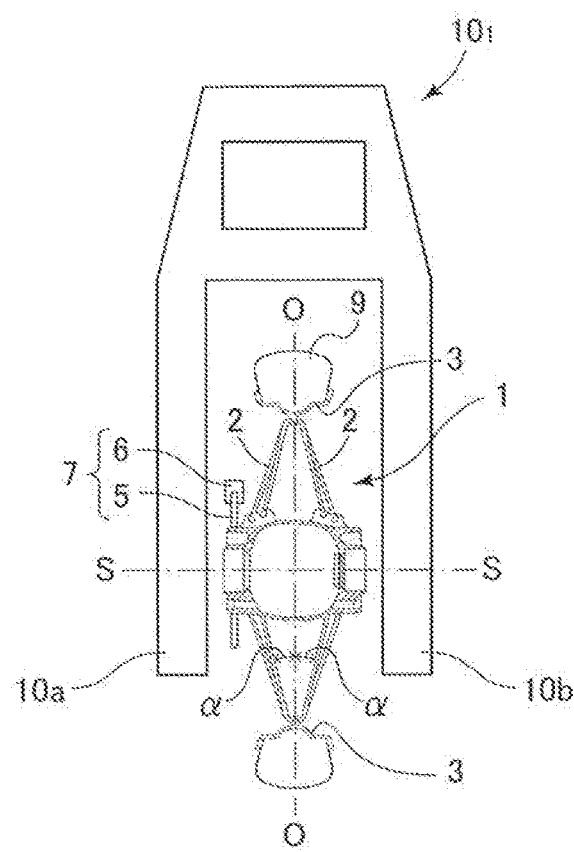
FIG. 5A illustrates a spoke wheel supported by a twin holding swing arm of a motorcycle.
Figure 5B:
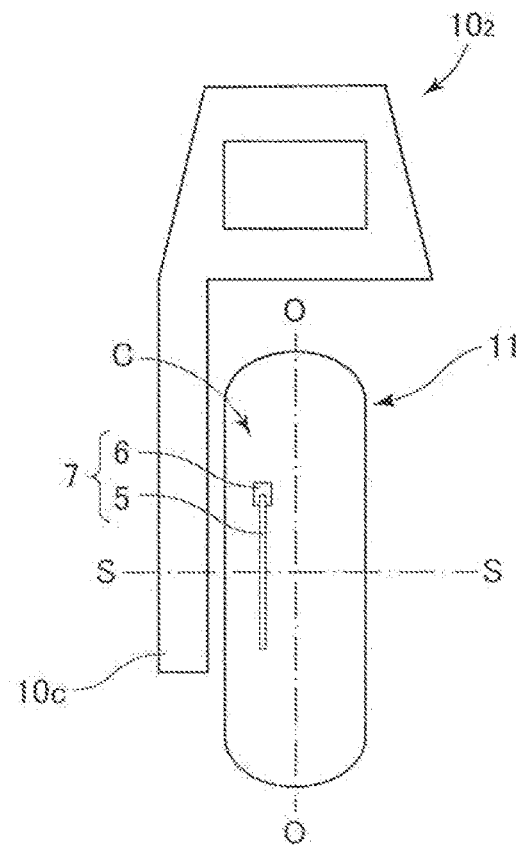
FIG. 5B illustrates a spoke wheel supported by a cantilever swing arm of a motor cycle.

As illustrated in FIG. 5B, while a cantilever swing arm 10₂ has a support arm 10c only one side, the spoke wheel 11 in which the brake unit 7 is stored within a width of the rim 12 can be supported by the cantilever swing arm 10₂ stably at the position close to the support arm 10c in the spoke wheel 11 even if the axle S is supported by the support arm 10c by the cantilever structure. This arrangement makes it possible to apply the spoke wheel 11 in which the spoke 15 is disposed by being offset to the cantilever swing arm 10₂. The spoke wheel 11 is stably supported by the support arm 10c even by the cantilever swing arm 102, so that controllability of the motorcycle can be assured and the sprocket can be attached to the outside of the support arm 10c. This arrangement also makes it possible to improve maintenance works in adjusting a chain and in replacing the tire and to enhance rigidity as compared to the twin holding swing arm 10₁ in equal weight ratio of the swing arms in a case where the spoke wheel 11 disposed by being offset is mounted to the cantilever swing arm 102. Still further, because the spoke 15 connects the mounting flanges 12a and 12g in the spoke wheel 11, the tubeless tire can be suitably mounted. It is also possible to reduce an unspring weight together with the cantilever swing arm 102 by lightening weight by the light alloy made rim 12 and the wire spokes 15.

FIG. 4 illustrates various spoke wheels in which spokes are disposed by being offset. While the spoke wheel 11 illustrated in FIG. 4A is basically the same with that of the previous embodiment illustrated in FIGS. 1 through 3, a shape of a well portion 12e of the rim is slightly different. That is, while the well portion 12e of the rim 12 of the previous embodiment illustrated in FIGS. 1 through 3 is formed of an arc surface and the inner flange 12g is provided at the center apex portion of the well inner diametric surface 12f similarly formed of the arc surface, a shape of the rim $12_1$ of the present embodiment is angular because steps $12h$ are formed between the well portion $12e$ and the bead seat portions $12c$ and $12d$. The inner flange $12g$ is provided at the widthwise center O-O at the approximately flat surface of the well inner diametric surface $12f$. The position of the inner flange $12g$ is not limited to the widthwise center and may be located at any position such that the inner flange $12g$ is formed on the well inner diametric surface $12f$ extending from the step portion $12h$ so as to project to the inner diametric side. A shape of the well portion $12e$ may be also any shape. Note that this is applicable also to other examples illustrated in FIG. 4.

Then, the spoke hole 17 is perforated through one of thick outer flanges $12a$ and $12b$ to form as the one mounting flange and the wire spoke 15 composing the first spoke group A is stretched between the mounting flange and the hub. The spoke hole 19 is perforated through the inner flange $12g$ serving as the mounting flange and the wire spoke 15 composing the second spoke group B is stretched between the mounting flange and the hub.

Figure 4A:
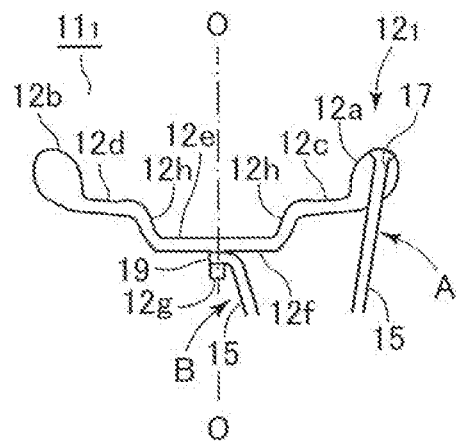
FIG. 4A is a schematic partial section view of the spoke wheel.
Figure 4B:
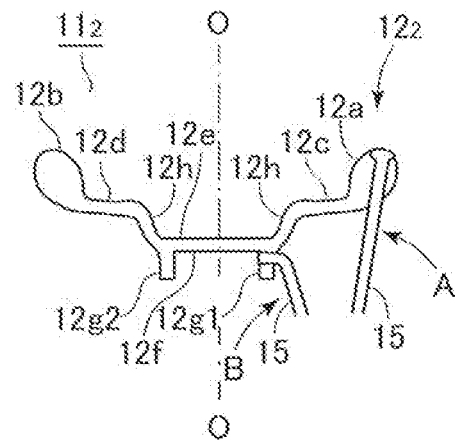
FIG. 4B is a schematic partial section view of a spoke wheel modified from the spoke wheel in FIG. 4A.

FIG. 4B illustrates a rim 122 in which right and left inner flanges $12g1$ and $12g2$ are formed on extension lines of the right and left dent portions $12h$ of the well portion $12e$ so as to project in the inner diametric direction of the well portion $12e$. Accordingly, along with the thick structure of the right and left outer flanges $12a$ and $12b$, the rim 122 is bilaterally symmetric with respect to the widthwise center O-O in section similarly to the previous embodiment. This arrangement makes it possible to selectively form a spoke wheel 112 being offset on the right side of the rim 122 by inserting the spoke 15 respectively into the right outer flange $12a$ and the right inner flange $12g1$ and to form the spoke wheel being offset on the left side of the rim 122 by inserting the spoke 15 into the left outer flange $12b$ and the left inner flange $12g2$.

While the outer flange $12a$ (or $12b$) and the inner flange $12g1$ (or $12g2$) on the same widthwise side with respect to the widthwise center O-O of the rim $12_2$ have been used in the spoke wheel $11_2$ described above, the spoke 15 may be assembled to the outer flange $12a$ (or $12b$) and the inner flange $12g2$ (or $12g1$) on the widthwise different side. In this case, while the spoke 15 is offset widthwise on one side with respect to the rim $12_2$, an offset amount thereof is small and a rate occupied by the hollow space C is small. Accordingly, the first spoke group A and the second spoke group B are disposed at positions relatively distant and connectivity of the rim with the hub improves by the spoke, the hollow space for storing the brake unit decreases in the spoke wheel $11_2$.

The spokes disposed by being offset from the widthwise center O-O does not mean that the both of the first spoke group A and the second spoke group B are limited to be located on the same one side with respect to the widthwise center O-O nor that the first spoke group A and the second spoke group B are located at a symmetrical position with respect to the widthwise center O-O. It means that the rim supporting structure of the both spoke groups is offset to the widthwise center O-O. Note that the stretch angle α of the first spoke group A is designed to be equal to the stretch angle α of the second spoke group B similarly to the other embodiment also in the spoke wheel 112.

Figure 4C:
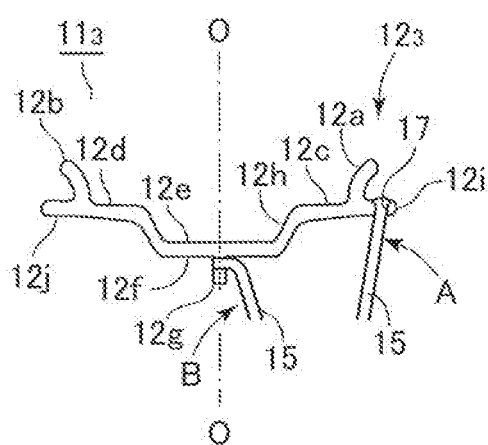
FIG. 4C is a schematic partial section view of a spoke wheel different from the spoke wheel in FIG. 4A.

A spoke wheel 113 illustrated in FIG. 4C is what a spoke mounting flange of the outer flange is modified. A rim $12_3$ is provided with flange-like mounting flanges $12i$ and $12j$ on extension lines of the bead seat portions $12c$ and $12d$ on sides of the right and left outer flanges $12a$ and $12b$ on outside of thin right and left outer flanges $12a$ and $12b$ for supporting tire. The rim $12_3$ is also provided with an inner flange $12g$ projecting in the inner diametric direction at the widthwise center O-O of the well inner diametric surface $12f$. The spoke hole 17 is perforated through either one (here, $12i$) of the right and left mounting flanges $12i$ and $12j$ described above to assemble the spoke 15 of the first spoke group A and the spoke 15 of the second spoke group B is assembled to the inner flange $12g$ to form the spoke wheel $11_3$.

A shape of the rim $12_3$ is also bilaterally symmetrical, and it is possible to connect the spoke by selecting either one of the right and left mounting flanges $12i$ and $12j$ and to select either one of right and left offset positions of the spoke. Note that the position of the inner flange $12g$ may be designed at a position other than the widthwise center position. The spoke wheel $11_3$ enables to set the widthwise position of the spoke variously and to enable to lighten the spoke wheel.

Figure 4D:
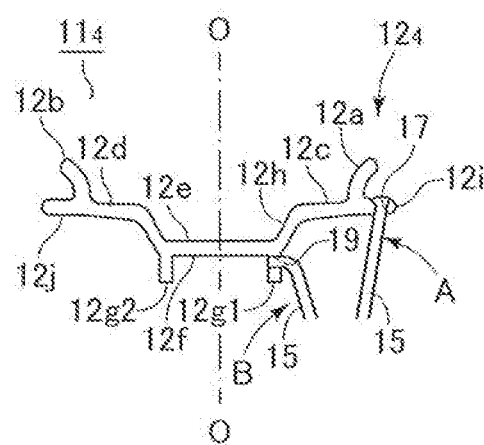
FIG. 4D is a schematic partial section view of a spoke wheel still different from the spoke wheel in FIG. 4A.

A rim $12_4$ illustrated in FIG. 4D is what a pair of inner flanges $12g1$ and $12g2$ as illustrated in FIG. 4B is provided in addition to the mounting flanges $12i$ and $12j$ extending outside to the right and left sides. Accordingly, the rim $12_4$ is bilaterally symmetrical in the same manner with other examples. A spoke wheel $11_4$ is constructed by selecting and assembling either one of the right and left mounting flanges $12i$ and $12j$ and either one of the inner flanges $12g1$ and $12g2$. For instance, a spoke hole 17 is perforated through the right mounting flange $12i$ to assemble the spoke 15 of the first spoke group A and a spoke hole 19 is perforated through the right inner flange $12g1$ to assemble the spoke 15 of the second spoke group B. Other than the abovementioned combination, the right mounting flange $12i$ may be combined with the left inner flange $12g2$, the left mounting flange $12j$ may be combined with the right inner flange $12g1$ and the left mounting flange $12j$ may be combined with the right inner flange $12g2$. The present embodiment enables to obtain the various spoke wheels $11_4$ by combining as described above.

Figure 4E:
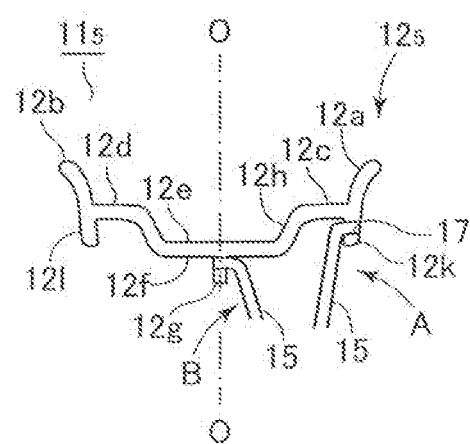
FIG. 4E is a schematic partial section view of a spoke wheel different from the spoke wheel in FIG. 4A.

A rim $12s$ illustrated in FIG. 4E is what right and left mounting flanges $12k$ and $12l$ extend in the inner diametric direction of the outer flanges $12a$ and $12b$ and project in the inner diametric side. The inner flange $12g$ is formed at the widthwise center O-O part of the well inner diametric surface $12f$. The rim $12s$ of the present embodiment is also formed to be bilaterally symmetrical. A spoke wheel $11_5$ is constructed by perforating a spoke hole 17 through either one of the right and left mounting flanges $12k$ and $12l$, e.g., through the right mounting flange $12k$, by assembling the spoke 15 of the first spoke group A and by assembling the spoke 15 of the second spoke group B to the inner flange $12g$ also in the rim $12s$ of the present embodiment. The spoke wheel $11_5$ can by lighten by thinning the mounting flanges and can be made in compact in the width direction. Note that the inner flange $12g$ may be provided not only at the widthwise center but also at any position.

Figure 4F:
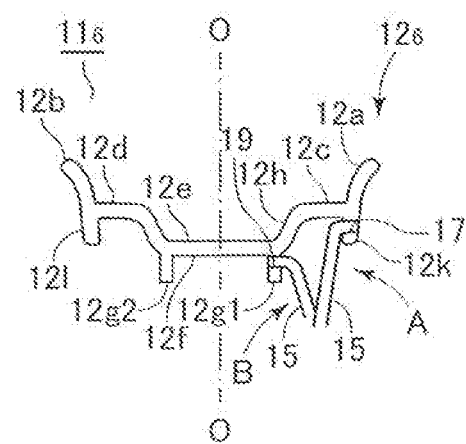
FIG. 4F is a schematic partial section view of a spoke wheel different from the spoke wheel in FIG. 4A.

A rim $12_6$ illustrated in FIG. 4F is what a pair of inner flanges $12g1$ and $12g2$ is provided symmetrically. The rim $12_6$ is provided with right and left bilaterally symmetrical mounting flanges $12k$ and $12l$ extending from the outer flanges $12a$ and $12b$ formed similarly to those described above. Therefore, similarly to the example described in FIG. 4D, various spoke wheels $11_6$ can be constructed by selectively combining either one of the right and left mounting flanges $12k$ and $12l$ with either one of the right and left inner flanges $12g1$ and $12g2$. For instance, the spoke wheel $11_6$ can be constructed by perforating a spoke hole 17 through the right mounting flange $12k$ and by assembling the spoke 15 of the first spoke group A and by perforating a spoke hole 19 through the right inner flange 12g1 and assembling the spoke 15 of the second spoke group B.

Note that while the abovementioned description has been made by defining the right and left directions such as the right (left) mounting flange, this is just a convenient name determined by a direction viewing the section, and the right and left sides are changed depending on a viewing direction. Still further, a number of the mounting flanges is not always limited to be two and may be three or more or may be one. While the abovementioned spoke wheel is suitably applicable to the cantilever swing arm, the spoke wheel is also applicable to the twin holding swing arm. The spoke wheel is also applicable to a front wheel and to a spoke wheel other than the motorcycle.

As described above, according to the present embodiment, the spoke wheel (11) comprises:

a light alloy rim (12);

a hub (13);

a plurality of wire spokes (15) connecting the rim with the hub, wherein the rim (12) includes flanges (12a and 12g) provided at asymmetrical positions with respect to a widthwise center (O-O) of the rim and is connected with the hub (13) by assembling the spokes (15) to the mounting flanges, and the spokes (15) are disposed by being offset to the widthwise center (O-O) of the rim.

Because the plurality of mounting flanges is provided at the asymmetrical positions in the rim made of light alloy and the wire spokes are assembled to these mounting flanges and are connected with the hub, it is possible to lighten the spoke wheel by the rim made of the light alloy and the wire spokes and to mount the tubeless tire. Still further, because the spokes are disposed at the positions offset in the width direction of the rim, it is possible to dispose the brake unit in the hollow space side where no spoke is stretched and to make the width of the spoke wheel in compact.

Still further, preferably the mounting flanges are two mounting flanges (12a and 12g) located at widthwise positions distant differently from the widthwise center (O-O) of the rim.

Thereby, because the wire spokes are assembled to the two mounting flanges located at the widthwise positions distant differently from the widthwise center of the rim, it is possible to securely connect the rim with the hub and to obtain the spoke wheel in which the spokes are disposed in offset with the relatively simple structure.

Still further, the spoke wheel includes a first spoke group (A) including spokes (15) assembled to either one (12a) of the two mounting flanges and a second spoke group (B) including the spokes (15) assembled to the other one (12g) of the two mounting flanges, wherein a stretch angle (a) of the spokes (15) of the first spoke group (A) is approximately equal to a stretch angle (a) of the spoke (15) of the second spoke group (B).

It is possible to obtain the spoke wheel in which the rim is stably connected with the hub by approximately equalizing the stretch angles of the spokes of the first and second spoke groups.

One of the two mounting flanges is one of a pair of flanges (12a and 12b)(12i and 12j) and (12k and 12l) disposed equidistantly with respect to the widthwise center at both widthwise outer parts of the rim, the other one of the two mounting flanges is the inner flange (12g) disposed at the position of the widthwise center in an inner diametric surface of the rim or one of inner flanges (12g1 and 12g2) equidistantly disposed with respect to the widthwise center, and the rim (12 and $12_1$ to $12_6$) is constructed symmetrically with respect to the widthwise center.

Because the rim is constructed symmetrically with respect to the widthwise center, the spoke wheel can be readily worked. It is also possible to select the offset disposition of the spoke to the right or left side of the rim, so that it is possible to accommodate the offset spoke wheel to any kind of motorcycles.

The two mounting flanges (12a and 12g) are disposed on one side, including the widthwise center (O-O) of the rim (12), with respect to the widthwise center.

Because the spokes is disposed by leaning toward one widthwise side of the rim, it is possible to provide the relatively large hollow space on a side opposite to the spokes within the width of the rim and to readily dispose the brake unit or the like.

One of the two mounting flanges is one (12a) of the pair of outer flanges (12a and 12b) supporting an outer side of the tire and the other one of the two mounting flanges is the inner flange (12g) projecting in the inner diametric direction from the inner diametric surface of the rim.

Because one of the pair of outer flanges serves as the mounting flange and the other inner flange provided on the rim inner diametric surface serves as the other mounting flange, it is possible to obtain the offset spoke wheel with the relatively simple structure.

Still further, with reference to FIG. 5B for example, the brake unit (7) including the disc (5) and the caliper (6) is disposed on the hollow space (C) side where no spoke is stretched (15) within the width of the rim (12).

Thereby, it is possible to dispose the brake unit in the hollow space side where no spoke is stretched within the width of the rim and to apply the spoke wheel to the cantilever swing arm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-155741, filed on Aug. 22, 2018, which is hereby incorporated by reference herein in its entirety.

What is claimed is:

1. A spoke wheel comprising:
a light alloy rim;
a hub; and
a plurality of wire spokes connecting the rim with the hub,
wherein the rim includes mounting flanges provided at asymmetrical positions with respect to a widthwise center of the rim and is connected with the hub by assembling the spokes to the mounting flanges, and
wherein the spokes are disposed by being offset to the widthwise center of the rim.

2. The spoke wheel according to claim 1, wherein the mounting flanges are two mounting flanges located at widthwise positions distanced differently from the widthwise center of the rim.

3. The spoke wheel according to claim 2, wherein the plurality of wire spokes comprises
a first spoke group comprising spokes assembled to either one of the two mounting flanges, and a second spoke group comprising spokes assembled to the other one of the two mounting flanges, wherein a stretch angle of the spokes of the first spoke group is approximately equal to a stretch angle of the spokes of the second spoke group.

4. The spoke wheel according to claim 2, wherein one of the two mounting flanges is one of a pair of flanges disposed equidistantly with respect to the widthwise center at both widthwise outer parts of the rim, wherein the other one of the two mounting flanges is an inner flange disposed at the position of the widthwise center on an inner diametric surface of the rim or one of inner flanges equidistantly disposed with respect to the widthwise center, and wherein the rim is constructed symmetrically with respect to the widthwise center.

5. The spoke wheel according to claim 2, wherein the two mounting flanges are disposed on one side, including the widthwise center of the rim, with respect to the widthwise center.

6. The spoke wheel according to claim 2, wherein one of the two mounting flanges is one of a pair of outer flanges supporting an outer side of a tire, and the other one of the two mounting flanges is an inner flange projecting in an inner diametric direction from an inner diametric surface of the rim.

7. The spoke wheel according to claim 1, wherein a brake unit comprising a disc and a caliper is disposed on a hollow space side where no spoke is stretched within a width of the rim.

\* \* \* \* \*